United States Patent
Gerzeny et al.

(10) Patent No.: US 9,840,182 B2
(45) Date of Patent: Dec. 12, 2017

(54) MOTORHOME LAYOUT

(71) Applicant: Coach House, Inc., Nokomis, FL (US)

(72) Inventors: David R. Gerzeny, Nokomis, FL (US);
Steven B. Gerzeny, Nokomis, FL (US);
Matthew L. Gerzeny, Nokomis, FL (US)

(73) Assignee: Coach House, Inc., Nokomis, FL (US)

( * ) Notice: Subject to any disclaimer, the term of this patent is extended or adjusted under 35 U.S.C. 154(b) by 0 days.

(21) Appl. No.: 14/950,671

(22) Filed: Nov. 24, 2015

(65) Prior Publication Data

US 2016/0193953 A1 Jul. 7, 2016

Related U.S. Application Data

(60) Provisional application No. 62/100,631, filed on Jan. 7, 2015.

(51) Int. Cl.
*B60P 3/00* (2006.01)
*B60P 3/36* (2006.01)
*B60R 15/00* (2006.01)

(52) U.S. Cl.
CPC ............... *B60P 3/36* (2013.01); *B60R 15/00* (2013.01)

(58) Field of Classification Search
CPC .................................. B60P 3/36; B60R 15/00
USPC ......................................... 296/156, 164, 165
See application file for complete search history.

(56) References Cited

U.S. PATENT DOCUMENTS

| | | | |
|---|---|---|---|
| 4,253,699 A | 3/1981 | Frank | |
| 4,550,946 A | 11/1985 | Hanemaayer | |
| 2004/0017096 A1* | 1/2004 | Crean | B60P 3/34 296/175 |
| 2005/0057071 A1* | 3/2005 | Sankrithi | B60P 3/36 296/156 |
| 2005/0189785 A1* | 9/2005 | Harder | B60P 3/34 296/171 |

\* cited by examiner

*Primary Examiner* — Joseph D Pape
(74) *Attorney, Agent, or Firm* — Dinsmore & Shohl LLP

(57) ABSTRACT

A Class B motorhome has an interior layout which includes a bathroom at the rear of the motorhome with a toilet and a shower with the toilet on one side of the bathroom and the shower on the opposite side of the bathroom.

2 Claims, 2 Drawing Sheets

MOTORHOME LAYOUT

CROSS REFERENCE TO RELATED APPLICATIONS

The present application is based upon U.S. Provisional Application 62/100,631 filed Jan. 7, 2015.

FIELD OF THE INVENTION

The present invention is directed to recreational motorhomes and more particularly to a motorhome built on the chassis of a cargo van or a camper van as the base.

BACKGROUND OF THE INVENTION

Heretofore Class B Motorhomes, which are small motorhomes using a cargo van or a camper van chassis as the base of the motorhome, have lacked the features of homes built on larger base chassis such as Class A and Class C motorhomes. The Class B motorhome of the present invention is built on a chassis such as the Mercedes-Benz 3500 Sprinter chassis (170 inch wheel base) and includes a bathroom at the rear separated from the kitchen in the front of the coach by twin beds. The bathroom at the rear of the coach includes a toilet and a shower with the toilet on one side of the bathroom and the shower on the opposite side of the bathroom.

BRIEF DESCRIPTION OF THE DRAWINGS

A better understanding of the present disclosure can be had by referring to the attached drawings in which.

DETAILED DESCRIPTION OF A PREFERRED EMBODIMENT

Figure 1:
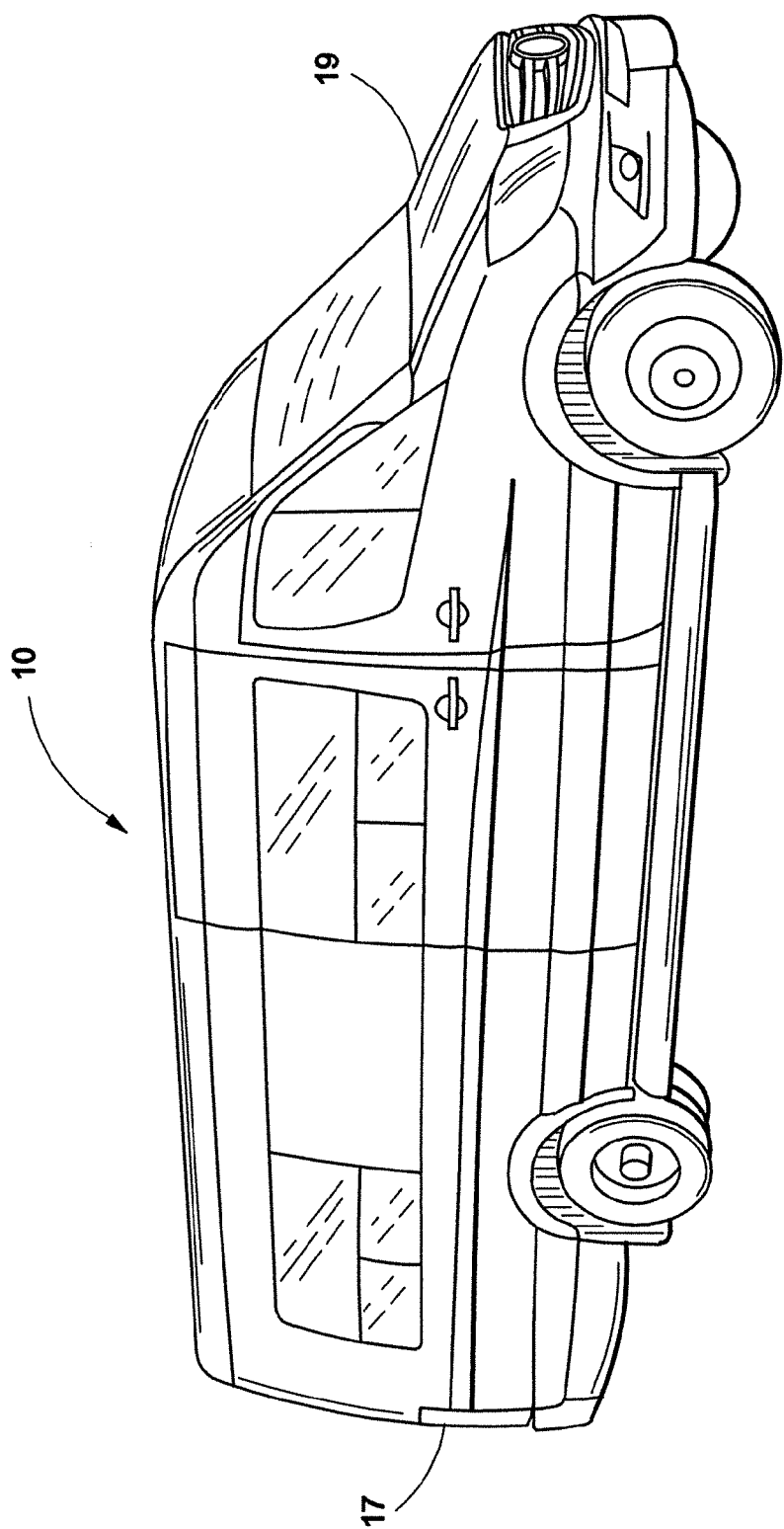
FIG. 1 is perspective drawing of the motorhome of the present invention.

FIG. 1 shows a motorhome 10 of the present invention. The motorhome 10 is built on a chassis (not shown) of a cargo van such as the chassis of a Mercedes-Benz 3500 Sprinter van. The wheel base 15 of the Mercedes-Benz Sprinter van is 170 inches. It should be apparent, however, that the motorhome 10 of the present invention could be built on the chassis of other similar size cargo vans with similar size wheelbases to provide a Class B motorhome.

Figure 2:
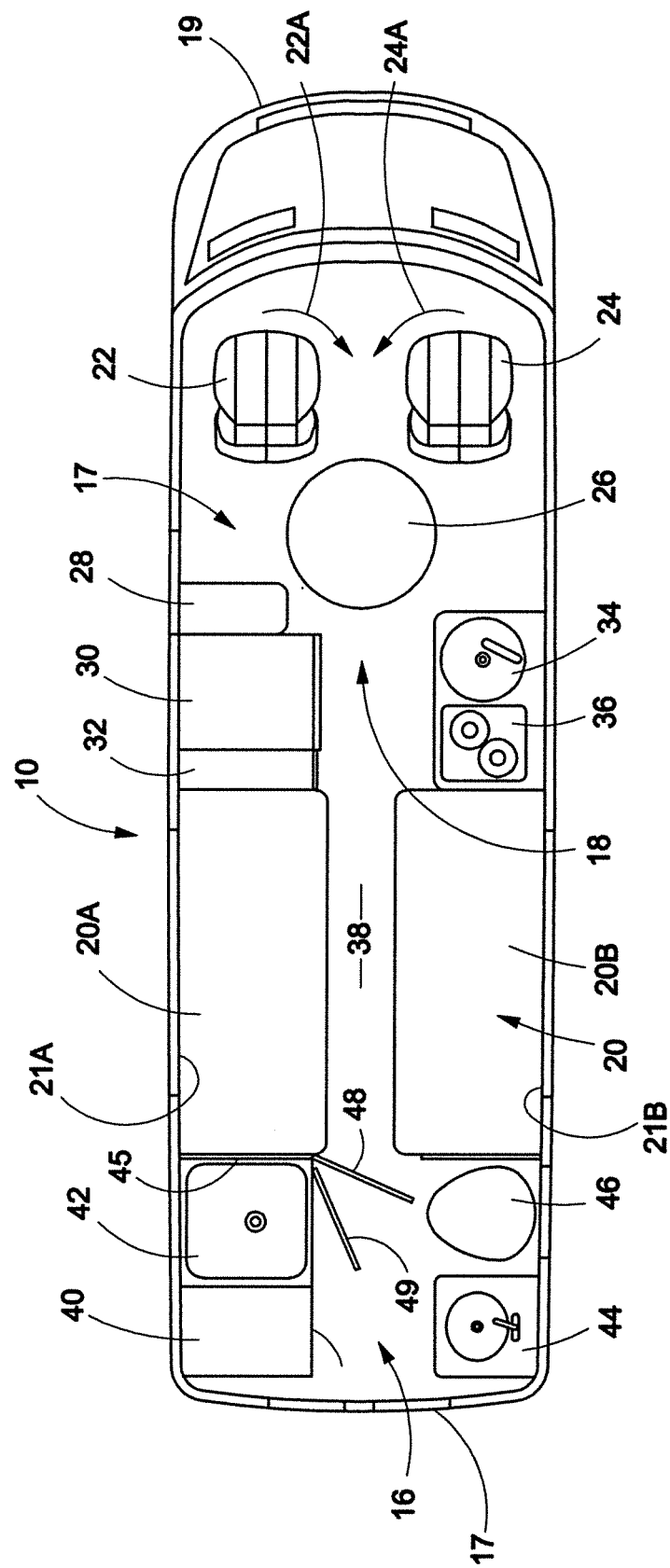
FIG. 2 is a diagrammatic cross-sectional view showing the interior layout of the motorhome of the present invention.

The interior layout of the motorhome 10 is shown in FIG. 2 as including a bathroom 16 at the rear 17 of the motorhome 10 and a kitchen 18 near the front 19 of the motorhome 10. A bedroom 20 includes twin beds 20A and 20B extending along interior walls 21A and 21B respectively to separate the bathroom 16 and the kitchen 18. A driver's chair 22 and a passenger's chair 24 are located at the front 19 of the motorhome 10 ordinarily facing the front 19 to enable the road to be viewed. The chairs 22 and 24 swivel as indicated by the arrows 22A and 24A to enable the chairs 22 and 24 to face toward the kitchen 18.

An office area 17 is formed between the kitchen 18 and the front 19 of the motorhome 10 and includes a removable table 26 disposed adjacent the chairs 22 and 24 so that the chairs can be swiveled into position to use the table 26.

The kitchen 18 includes a desk 28, a refrigerator and microwave combination 30 and a pantry 32 positioned along the interior wall 21A and a sink 34 and a stove 36 positioned along the interior wall 21B and spaced from the desk 28, the refrigerator microwave 30, and the pantry 32 by a central pathway 38.

The bathroom 16 includes a cabinet 40 and a shower 42 along the interior wall 21A of the motorhome 10 and a sink 44 and a toilet 46 spaced along the interior wall 21B and opposite the cabinet 40 and the shower 42. A wall 45 separates the bedroom 20 from the bathroom 16 and a door 48 is provided in the wall 45 to permit entry into and egress from the bathroom 16. The central pathway 38 extends through the open door 48 and into the bathroom 16. The shower 42 is on one side of the pathway 38 and the toilet 46 is on the other so that both can be used simultaneously. A shower door 49, is provided so that use of the shower 42 will not affect the area of the bathroom 16 containing the toilet 46 when the shower door 49 is closed The door 48 is provided to enable the bathroom 16 to be closed with respect the remainder of the interior of the motorhome 10.

The present invention is directed to the layout for a Class B motorhome. Motorhomes are classified as Class A, Class B or Class C. Class A motorhomes are the largest and are generally in the form of converted buses. Class B motorhomes are built using cargo vans. Class C motorhomes are larger than Class B motorhomes and they use a cut-away chassis built specifically for motorhome use.

Class B motorhomes are quite small in comparison to Class A and Class C motorhomes. They typically have a small kitchen, living room, and bedroom. The bathroom, if one is included at all, generally has shower and toilet in the same space (called a wet bath) so that both cannot be used at the same time and use of the shower causes water to spray throughout the bathroom The present invention provides a Class B motorhome with an interior layout that takes advantage of the interior space to provide roomy accommodations for 2-4 people. A unique feature of the layout is the provision of a bathroom provided with separated and spaced shower and toilet facilities.

While a description of one embodiment of the present invention has been provided it should be apparent that modifications to the embodiment can be made without departing from the present invention.

We claim:

1. A motorhome built on a cargo van chassis, said motorhome having a layout that comprises
    a kitchen, and a bathroom separated from said kitchen;
    a pathway extending from said kitchen and into said bathroom;
    a bedroom separating said kitchen and said bathroom;
    said pathway extending through said bedroom into said bathroom;
    said bedroom includes a bed disposed on each side of said pathway intermediate said kitchen and said bathroom; and
    said bathroom including a toilet and an enclosed shower separated from each other by said pathway.

2. An interior layout for a motorhome
    said motorhome constructed on a cargo van chassis and having a front and a rear;
    said layout comprising a kitchen, a bedroom, and a bathroom separated from said kitchen a pathway extending from the front of said motorhome to the rear with said bathroom located in the rear of said motorhome;
    a driver's chair and a passenger chair located at the front of the motorhome and normally facing the front of the motorhome;

said chairs being swivable to face the kitchen of the motorhome;
a removable table disposed between the chairs and the kitchen;
said layout further comprising a pathway extending from said kitchen through said bedroom and into said bathroom;
said bathroom including a toilet and a shower separated from each other by said pathway; and
said bedroom including a bed disposed on each side of said pathway intermediate said kitchen and said bathroom.

* * * * *